(12) United States Patent
Hwang et al.

(10) Patent No.: US 7,662,907 B2
(45) Date of Patent: Feb. 16, 2010

(54) ALL-AROMATIC POLYESTER COMPOUND, ITS PREPARATION, AND COMPOSITION CONTAINING THE SAME

(75) Inventors: Kuen Yuan Hwang, Hsinchu (TW); An Pang Tu, Hsinchu (TW); Chih Fu Chen, Hsinchu (TW); Jia Sheng Liau, Hsinchu (TW)

(73) Assignee: Chang Chun Plastics Co., Ltd, Taipei (TW)

( * ) Notice: Subject to any disclaimer, the term of this patent is extended or adjusted under 35 U.S.C. 154(b) by 278 days.

(21) Appl. No.: 11/723,337

(22) Filed: Mar. 19, 2007

(65) Prior Publication Data

US 2008/0146770 A1    Jun. 19, 2008

(30) Foreign Application Priority Data

Dec. 15, 2006  (TW) .............................. 95147002 A

(51) Int. Cl.
*C08G 63/00*    (2006.01)

(52) U.S. Cl. ............... 528/308.3; 528/302; 252/299.01; 252/299.67

(58) Field of Classification Search ............... 528/171, 528/172, 173, 176, 193, 194, 302, 308, 308.6, 528/182; 252/299.01, 299.62, 299.66, 299.67; 428/402

See application file for complete search history.

(56) References Cited

U.S. PATENT DOCUMENTS

| 4,748,229 | A | * | 5/1988 | Hisgen et al. | ............... 528/183 |
| 5,399,656 | A | * | 3/1995 | Nitta et al. | .................. 528/193 |
| 6,274,242 | B1 | * | 8/2001 | Onodera et al. | .......... 428/411.1 |

* cited by examiner

*Primary Examiner*—Ling-Siu Choi
*Assistant Examiner*—Frances Tischler
(74) *Attorney, Agent, or Firm*—Birch, Stewart, Kolasch & Birch, LLP.

(57) ABSTRACT

The present invention relates to all-aromatic polyesters, a method for preparing the same, and a polyester composition containing the same. The present method is carried out in two stages of first carrying out a prepolymerization to obtain a prepolymer having a specific particle size distribution, then carrying out a solid polymerization.

The present method can control the quality of polyester effectively and produce all-aromatic polyester exhibiting excellent flowability, high heat resistance, and high solder heat resistance.

3 Claims, No Drawings

ALL-AROMATIC POLYESTER COMPOUND, ITS PREPARATION, AND COMPOSITION CONTAINING THE SAME

1. TECHNICAL FIELD

The present invention relates to all-aromatic polyesters, a method for preparing the same, and a polyester composition containing the same.

According to the present method, it can control the quality of polyester effectively and produce all-aromatic polyester exhibiting excellent flowability, high heat resistance, and high solder heat resistance.

2. BACKGROUND OF THE INVENTION

Melt processing type liquid crystal polyesters (LCP) are well known in this field. Such liquid crystal polyesters have been widely used in various fields as a molding material for precisely molding due to their excellent heat-resistance and mechanical physical properties and due to their flowability. Since liquid crystal polyesters exhibit a very high melt temperature, they are mainly added with inorganic fillers to prepare minute electronic parts such as connector, relay and the like. In producing minute electronic parts such as connector, relay and the like, such material is also required to possess high resistance, high strength, high dimension precision, and high solder heat-resistance.

To obtain all-aromatic polyester with quality stability and to obtain products made from the all-aromatic polyester, which fulfill the requirements of high resistance, high strength, high dimension precision, and high solder heat-resistance, the present inventors have conducted an investigation on the process for producing all-aromatic polyester and thus completed the present invention.

3. SUMMARY OF THE INVENTION

The present invention relates to all-aromatic polyesters, a method for preparing the same, and a polyester composition containing the same.

The present invention provides a method for preparing all-aromatic polyesters, which comprises
(a) subjecting the following ingredients to prepolymerization:
  (1) 35~65 mole % of hydroxyl benzoic acid,
  (2) 0~10 mole % of benzoquinone,
  (3) 15~35 mole % of dihydroxybiphenyl,
  (4) 15~35 mole % of terephthalic acid,
  (5) 0~15 mole % of isophthalic acid, and
  (6) acetic anhydride in amount of 1.0~1.3 times moles relative to the total hydroxyl moles contained in (1) to (5);
  to obtain prepolymer which is then screened through a sieve to control the particle size distribution of the resultant prepolymer as follows:
    10~39 mesh=5~20 wt %;
    40~59 mesh=20~40 wt %;
    60~79 mesh=40~70 wt %;
    80~120 mesh=0~15 wt %;
(b) then subjecting the prepolymer having the above particle size distribution to a solid polymerization to obtain all-aromatic polyesters.

According to the method of the present invention, the prepolymerization is carried out at a temperature of from 140~160° C. for 0.5~4 hours, then increase the temperature from 140~160° C. to 280~320° C. at a heating rate of 0.3~3° C./minute to collect distillate side products, the temperature is maintained at 280~320° C. for 0.5~3 hours, and the residue remained is the product polyester prepolymer.

According to the method of the present invention, the solid polymerization is carried out at a temperature of from 250° C. to 320° C. for 4~20 hours.

According to the method of the present invention, the sieve used to control the particle size distribution of the prepolymer is a shaking type auto-sieve equipped with five screens composed of a 10-mesh screen, a 40-mesh screen, a 60-mesh screen, a 80-mesh screen, and a 120-mesh screen to obtain the prepolymer powder having the particle distribution in the above range.

According to the method of the present invention, the all-aromatic polyester is the all-aromatic polyester having repeating units of the following formula:

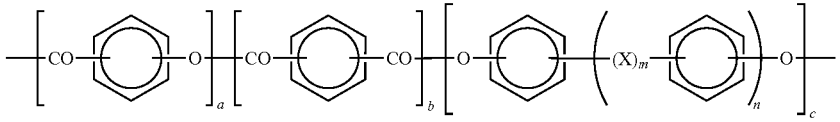

wherein a/(a+b+c)=0.35~0.70; b/(a+b+c)=0.15~0.35; c/(a+b+c)=0.9~1.1; m and n are each a number of 0 or 1; X represents a $C_{1-6}$ alkylene group.

If the content of the repeating unit designed by a in the all-aromatic polyester is less than 35 mole % (i.e. the value of a/(a+b+c) is less than 0.35), the heat resistance of the resultant polyester will be insufficient. If the content of the repeating unit designed by a is more than 70 mole % (i.e. the value of a/(a+b+c) is more than 0.70), the operability of the all-aromatic polyester will be deteriorated. The content of the repeating unit designed by a is preferably from 35 to 65 mole %, more preferably from 45 to 55 mole %. If the content of the repeating unit designed by b in the all-aromatic polyester is less than 15 mole % (i.e. the value of b/(a+b+c) is less than 0.15), the heat resistance of the resultant polyester will be insufficient. If the content of the repeating unit designed by b is more than 35 mole % (i.e. the value of b/(a+b+c) is more than 0.35), the operability of the all-aromatic polyester will be deteriorated.

If in the all-aromatic polyester, the ratio of the content of the repeating unit designed by c to that of the repeating unit designed by b is less than 0.9 or more than 1.1, the polymerization degree of the all-aromatic polyester will be insufficient and its physical property will be deteriorated.

In the present invention, the $C_{1-6}$ alkylene group represented by X means a residue obtained by removing two hydrogen atoms from a straight or branched alkane containing 1 to 6 carbon atoms. The examples of the C1-6 alkylene group include methylene group, ethylene group, straight or branched propylene group, straight or branched butylene group, straight or branched pentylene group, or straight or branched hexylene group, and the like.

According to the present method, it can produce the all-aromatic polyester containing the above repeating unit in excellent quality stability, and when the polyester is combined with inorganic fillers, the resultant composition exhibits high flowability, high heat-resistance, and high solder heat resistance.

The present invention also relates to an all-aromatic polyester composition, which comprises 40~80 wt % of the present all-aromatic polyester and 20~60 wt % of inorganic fillers. The present composition is useful in preparing minute electronic parts such as connector, relay and the like.

In the present polyester composition, these inorganic fillers are one or more fillers selected from the group consisting of talc, mica, $CaSiO_3$, carbon black, glass fiber, carbon fiber, synthetic polymeric fiber, aluminum fiber, aluminum silicate fiber, alumina fiber, titanium fiber, magnesium fiber, rockwool fiber, steel fiber, calcium silicate, silica, and titanium dioxide. Although the particle diameter of the inorganic fillers is not critical, it is preferable in a range of from 0.1 to 150 µm.

According to the present polyester composition, by using the all-aromatic polyester prepared by the present method, it can produce products exhibiting high resistance, high strength, high dimension stability, and high solder heat resistance.

4. DETAILED DESCRIPTION THE PRESENT INVENTION

The present invention will be illustrated in detail by reference to the following Examples. The Examples are only presented to illustrate the present invention but not to limit the scope of the present invention.

EXAMPLE 1

(a) Prepolymerization of Polyester Compound

690 Parts by weight of p-hydroxybenzoic acid (PHBA) (50 mole %), 20 parts by weight of benzoquinone (BQ) (1.8 mole %), 430 parts by weight of 4,4'-dihydroxybipheny (DOD) (23.2 mole %), 290 parts by weight of terephthalic acid (TPA) (17.5 mole %), 125 parts by weight of isophthalic acid (IPA) (7.5 mole %), and 1020 parts by weight of acetic anhydride (100 mole %) were added into a reactor and subjected to acetylation at a temperature of about 160° C. for 0.5 hour. The temperature of the reaction was increased to 300° C. at a heating rate of 0.3° C./min and maintained at that temperature for 0.5 hour. During the heating, the byproduct acetic acid was distilled off and the residue remaining in the reactor was the polyester prepolymer. The resultant polyester prepolymer was ground by a crusher and screened through a shaking type sieve equipped with five screens composed of a 10-mesh screen, a 40-mesh screen, a 60-mesh screen, a 80-mesh screen, and a 120-mesh screen to obtain the prepolymer powder having the following particle size distribution (PSI).

10-39 mesh: 5%
40-59 mesh: 25%
60-79 mesh: 55%
80-120 mesh: 15%

(b) Solid Polymerization of the Polyester Prepolymer

The resultant prepolymer powder having the above particle size distribution was placed into a solid polymerization reactor and heated to the temperature of 250° C., and then continuously increased the temperature to about 320° C. at a heating rate of 0.3° C./minute and maintained at the temperature for 4 hours to obtain the all-aromatic polyester of the present invention.

(c) The Preparation of Polyester Composition

By using a twin screw extruder (Twin Screw Extruder Model ZPT28 manufactured by Genix Industries Co., Ltd. Taiwan, R.O.C.), 70 kg of the polyester obtained in step (b) were blended with 30 kg of glass fiber at a rotation speed of 200 rpm and a temperature of 340° C. to obtain polyester composition and then pelleted. The resultant pellets were measured their flow beginning temperature ($T_{fb}$) as described below.

The resultant polyester pellets were injection molded into sheets by using Injection Molding Machine (Model HC-350CL manufactured by Hwa Chin Machinery Co., Ltd. Taiwan, R.O.C.) at a barrel temperature of 330° C. and a die temperature of 100° C. The resultant sheets were tested their flexural strength, solder heat resistance, and heat deforming temperature as described below.

1. Measurement of the Flow Beginning Temperature ($T_{fb}$) of the Polyester Composition Using Model Koka Flow Tester manufactured by Shimadzu Corporation, Japan, the resultant polyester pellets were applied back pressure of 100 kgf/cm² (plasticizing pressure) and heated at a heating rate of 4° C./minute until the polyester resin flowed out from the orifice having a diameter of 1 mm and a length of 10 mm. The temperature when the melt viscosity of the resin achieved 48000 Pa·s was considered as the Flow Beginning Temperature ($T_{fb}$).

2. Measurement of the Flexural Strength

The polyester composition was injection molded into a sheet specimen having a length of 80 mm, a width of 10 mm, and a thickness of 4.0 mm, and tested its Flexural Strength according to the method and conditions recited in ASTM D790.

3. Measurement of Heat Deforming Temperature

The polyester composition was injection molded into a sheet specimen having a length of 127 mm, a width of 12.7 mm, and a thickness of 6.4 mm, and tested its Heat Deforming Temperature according to the method of ASTM D648 under a loading of 18.6 kg/cm².

4. Measurement of Solder Heat Resistance

The polyester composition was injection molded into a sheet specimen having a length of 80 mm, a width of 10 mm, and a thickness of 4 mm, and then immersed into a solder pot at a temperature of 288° C. for 90 seconds. The appearance of the specimen was observed. If there is blisters or deformation, it marked as x, and if there is no blisters or deformation, it marked as ◯.

EXAMPLES 2-4

Polyester prepolymer were prepared as the same as the method and composition in Example 1, except that the particle size distribution of the prepolymer was changed to those shown in Table 1. Similarly, the resultant prepolymer was subjected to the solid polymerization as the same as Example 1 to obtain polyester and then allowed the polyester blending with glass fiber to give polyester composition. Finally, the resultant polyester composition was injection molded into sheet specimens and measured the relevant properties as mentioned above.

EXAMPLE 5

(a) Prepolymerization of Polyester Compound 483.4 Parts by weight of p-hydroxybenzoic acid (PHBA) (35 mole %), 633.1 parts by weight of 4,4'-dihydroxybipheny (DOD) (34 mole %), 348.9 parts by weight of terephthalic acid (TPA) (21 mole %), 166.1 parts by weight of isophthalic acid (IPA) (10 mole %), and 1326 parts by weight of acetic anhydride (130 mole %) were added into a reactor and subjected to acetylation at a temperature of about 140° C. for 4 hours. The temperature of the reaction was increased to 300° C. at a heating rate of 3° C./min and maintained at that temperature for 3 hours. During the heating, the byproduct acetic acid was distilled off and the residue remaining in the reactor was the polyester prepolymer. The resultant polyester prepolymer was ground by a crusher and screened through a shaking type sieve equipped with five screens composed of a 10-mesh screen, a 40-mesh screen, a 60-mesh screen, a 80-mesh screen, and a 120-mesh screen to obtain the prepolymer powder having the following particle size distribution.

10-39 mesh: 5%
40-59 mesh: 25%
60-79 mesh: 55%
80-120 mesh: 15%

(b) Solid Polymerization of the Polyester Prepolymer

The resultant prepolymer powder having the above particle size distribution was placed into a solid polymerization reactor and heated to the temperature of 250° C., and then continuously increased the temperature to about 320° C. at a heating rate of 0.05° C./minute and maintained at the temperature for 20 hours to obtain the all-aromatic polyester of the present invention.

(c) The Preparation of Polyester Composition

By using a twin screw extruder (Twin Screw Extruder Model ZPT28 manufactured by Genix Industries Co., Ltd. Taiwan, R.O.C.), 70 kg of the polyester obtained in step (b) were blended with 30 kg of glass fiber at a rotation speed of 200 rpm and a temperature of 340° C. to obtain polyester composition and then pelleted. The resultant pellets were measured their flow beginning temperature ($T_{fb}$) as described above.

The resultant polyester pellets were injection molded into sheets by using Injection Molding Machine (Model HC-350CL manufactured by Hwa Chin Machinery Co., Ltd. Taiwan, R.O.C.) at a barrel temperature of 330° C. and a die temperature of 100° C. The resultant sheets were tested their flexural strength, solder heat resistance, and heat deforming temperature as described above.

EXAMPLES 6-7

Polyester prepolymer were prepared as the same as the method and composition in Example 5, except that the particle size distribution of the prepolymer was changed to those shown in Table 1. Similarly, the resultant prepolymer was subjected to the solid polymerization as the same as Example 5 to obtain polyester and then allowed the polyester blending with glass fiber to give polyester composition. Finally, the resultant polyester composition was injection molded into sheet specimens and measured the relevant properties as mentioned above.

COMPARATIVE EXAMPLES 1-2

Polyester prepolymer were prepared as the same as the method and composition in Example 1, except that the particle size distribution of the prepolymer was changed to those shown in Table 1. Similarly, the resultant prepolymer was subjected to the solid polymerization as the same as Example 1 to obtain polyester and then allowed the polyester blending with glass fiber to give polyester composition. Finally, the resultant polyester composition was injection molded into sheet specimens and measured the relevant properties as mentioned above.

COMPARATIVE EXAMPLES 3-4

Polyester prepolymer were prepared as the same as the method and composition in Example 5, except that the particle size distribution of the prepolymer was changed to those shown in Table 1. Similarly, the resultant prepolymer was subjected to the solid polymerization as the same as Example 5 to obtain polyester and then allowed the polyester blending with glass fiber to give polyester composition. Finally, the resultant polyester composition was injection molded into sheet specimens and measured the relevant properties as mentioned above.

TABLE 1

| | Ex. No. 1 | Ex. No. 2 | Ex. No. 3 | Ex. No. 4 | Ex. No. 5 | Ex. No. 6 | Ex. No. 7 | Com. Ex. No. 1 | Com. Ex. No. 2 | Com. Ex. No. 3 | Com. Ex. No. 4 |
|---|---|---|---|---|---|---|---|---|---|---|---|
| PSI | | | | | | | | | | | |
| 10-39 mesh (wt %) | 5 | 10 | 20 | 5 | 10 | 20 | 5 | 25 | 5 | 25 | 5 |
| 40-59 mesh (wt %) | 25 | 30 | 40 | 25 | 30 | 40 | 25 | 35 | 30 | 35 | 30 |
| 60-79 mesh (wt %) | 55 | 50 | 35 | 70 | 50 | 40 | 70 | 40 | 40 | 40 | 35 |
| 80-120 mesh (wt %) | 15 | 10 | 5 | 0 | 10 | 5 | 0 | 0 | 25 | 0 | 25 |
| Total | 100 | 100 | 100 | 100 | 100 | 100 | 100 | 100 | 100 | 100 | 100 |
| Polyester Composition | | | | | | | | | | | |
| Polyester (Kg) | 70 | 70 | 70 | 70 | 70 | 70 | 70 | 70 | 70 | 70 | 70 |
| Glass fiber (Kg) | 30 | 30 | 30 | 30 | 30 | 30 | 30 | 30 | 30 | 30 | 30 |
| $T_{fb}$ (° C.) | 310 | 312 | 316 | 313 | 315 | 313 | 316 | 312 | 309 | 311 | 310 |
| Flexural strength (kg/mm$^2$) | 19.3 | 19.2 | 19.6 | 19.3 | 19.8 | 19.7 | 20.2 | 17.4 | 17.7 | 16.9 | 17.2 |
| Heat deforming Temperature (° C.) | 281 | 280 | 282 | 281 | 278 | 280 | 282 | 265 | 263 | 260 | 261 |
| Solder heat resistance | ◯ | ◯ | ◯ | ◯ | ◯ | ◯ | ◯ | X | X | X | X |

From the data in Table 1, it is clear that in Comparative Example 1, the content of the polyester having particle size in the range of 10-39 mesh is relative increased, i.e. proportion of larger particles is increased. Since the large particles are more, the byproduct (i.e. acetic acid) is easily accumulated in the reaction without distilling off, which results in incompletely polymerization. Thus, when the polyester is blended with glass fiber to obtain polyester composition, the strength and solder heat resistance of the product prepared therefrom are insufficient, and its heat resistance is deteriorated.

While in Comparative Example 2, the content of the polyester having particle size in the range of 80-120 mesh is relative increased, i.e. proportion of smaller particles is increased. Since smaller particles is increased, during solid polymerization, the polyester is heated and easily melt and agglomerated, and results in covering the byproduct and thus byproduct is difficultly distilled off, which results in incompletely polymerization. Thus, when the polyester is blended with glass fiber to obtain polyester composition, the strength and solder heat resistance of the product prepared therefrom are insufficient, and its heat resistance is deteriorated.

Contrarily, in Examples 1 to 7, the particle size distribution of the polyester is in the specified range. By controlling the particle size distribution, it can control the quality of polyester effectively and produce all-aromatic polyester exhibiting excellent flowability, high heat resistance, and high solder heat resistance.

What is claimed is:

1. A method for preparing all-aromatic polyesters, which comprises:
   (a) subjecting the following ingredients to prepolymerization:
   (1) 35~65 mole % of hydroxyl benzoic acid,
   (2) 0~10 mole % of benzoquinone,
   (3) 15~35 mole % of dihydroxybiphenyl,
   (4) 15~35 mole % of terephthalic acid,
   (5) 0~15 mole % of isophthalic acid, and
   (6) acetic anhydride in amount of 1.0~1.3 times moles relative to the total hydroxyl moles contained in (1) to (5);
   to obtain prepolymer which is then screened through a sieve to control the particle size distribution of the resultant prepolymer as follows:
   10~39 mesh=5~20 wt %;
   40~59 mesh=20~40 wt %;
   60~79 mesh=40~70 wt %;
   80~120 mesh=0~15 wt %;
   (b) then subjecting the prepolymer having the above particle size distribution to a solid polymerization to obtain all-aromatic polyesters.

2. The method according to claim 1, wherein the prepolymerization is carried out at a temperature of from 140~160° C. for 0.5~4 hours, then increase the temperature from 140~160° C. to 280~320° C. at a heating rate of 0.3~3° C./minute to collect distillate side products, the temperature is maintained at 280~320° C. for 0.5~3 hours, and the residue remained is the product polyester prepolymer.

3. The method according to claim 1, wherein the solid polymerization is carried out at a temperature of from 250° C. to 320° C. for 4~20 hours.

* * * * *